United States Patent
Johnson

Patent Number: 5,892,163
Date of Patent: Apr. 6, 1999

[54] SEWER AND PIPELINE INSPECTION TRANSPORTER TOOL

[75] Inventor: Dennis J. Johnson, Salem, N.H.

[73] Assignee: Geophysical Survey Systems, Inc., North Salem, N.H.

[21] Appl. No.: 13,580

[22] Filed: Jan. 27, 1998

[51] Int. Cl.[6] ................................................. H04N 7/18
[52] U.S. Cl. .................................................. 73/865.8
[58] Field of Search ........................... 73/866.5, 865.8, 73/623, 152.54, 152.57, 152.58; 324/220, 221, 346, 351–353, 355, 556, 374; 166/253.1, 250.16, 250.01; 367/35

[56] References Cited

U.S. PATENT DOCUMENTS

| | | | |
|---|---|---|---|
| 4,087,739 | 5/1978 | Vieiro . | |
| 4,105,972 | 8/1978 | Smith | 324/220 |
| 4,292,589 | 9/1981 | Bonner | 324/221 |
| 4,586,380 | 5/1986 | Patterson | 73/623 |
| 5,285,689 | 2/1994 | Hapstack et al. | 73/623 |
| 5,423,230 | 6/1995 | Olander et al. | 73/865.8 |
| 5,527,035 | 6/1996 | Fowler et al. | 324/220 |
| 5,612,625 | 3/1997 | Suyama et al. | 324/635 |

Primary Examiner—Robert Raevis
Attorney, Agent, or Firm—Madan & Morris, PLLC

[57] ABSTRACT

A sewer inspection device includes a body that has a number of transducers attached to the body. The transducers are attached on pads that can be extended away from the body to enable the transducers to make contact with a sewer wall. The device is lowered into the sewer in the compact, non-extended position of the pads. Subsequently, the pads are extended to make contact with the sewer walls. The body is pulled along the sewer by means of an armored cable extending to the surface. The armored cable includes a conductor or fiber-optic cable for carrying signals between the transducers and a surface controller. In one embodiment, the transducers generate ground penetrating radar (GPR) signals and detect the reflected signals. Defects in the vicinity of the sewer pipe affect the reflected signals. Analysis of the reflected signals provides information about the nature of the defects. Other embodiments of the invention include sonic, gamma ray and electromagnetic induction transducers. The device may also be provided with a supplementary transducer module on the cable that rests on the bottom of the sewer and makes additional measurements relating to the sewer pipe and its immediate surroundings.

23 Claims, 3 Drawing Sheets

SEWER AND PIPELINE INSPECTION TRANSPORTER TOOL

FIELD OF THE INVENTION

This invention pertains to sewer inspection devices, and methods for using such devices, for safe and accurate inspection and surveying of the exterior and interior of sewers along with a structure for conveying an inspection tool inside a sewer and communicating results to an exterior location.

BACKGROUND OF THE INVENTION

Municipalities and others recognize that sewer leaks are highly undesirable in that ground water may leak into the sewer and substantially increase the demand upon sewer treatment facilities. There is also the risk of contamination of ground water by liquids leaking out of the sewer. Because of this, it is desirable to inspect sewers for leaks. It is common in such inspection systems to move a TV camera along the sewer to check for leaks and make recordings as to the location of the leaks along the sewer. U.S. Pat. No. 4,107,738 issued to Van Norman discloses a TV camera mounted on skids with an associated hydraulic jet nozzle unit whereby delivery of water under pressure to the jet nozzle unit causes rearwardly-directed jets of water to advance the camera and jet unit along a sewer, with the structure being retracted along the sewer by suitable means, such as rewinding a hose which supplies water under pressure to the jet nozzle unit. This, and other prior art devices that rely on visual inspection require that the interior of the sewer be first flushed clean with water to make a visual inspection possible.

Visual inspection may not always reveal the full extent of defects in the walls of a sewer. In particular, visual inspection only reveals defects manifest on the inside of the sewer. Visual inspection gives no indication of voids or collapsed zones on the outside of sewers that are indicative of leaks from the sewer. These collapsed zones or voids that could be air filled or fluid filled, are indications of leakage of contaminants from the sewer and possible future problems in terms of subsidence of the ground above the sewer. Visual inspection is also not a reliable method of determining the size or shape of the sewer. For example, if due to stresses, the sewer has deviated from a circular cross section, this would not be obvious on a visual inspection. In addition, even where defects are noted on such a visual inspection, repair work is complicated by the necessity of requiring properly surveyed positions for the observed defects. Without this accurate survey, subsequent remedial work becomes harder to carry out.

It is desirable to have a sewer inspection device and method that does not rely only on visual inspection of the sewer. Such a device should preferably be able to detect flaws outside the sewer and changes in the thickness of the sewer. Such a device should be able to make accurate measurements of the location of flaws, whether inside or outside the sewer. Such a device should also be able to function in a sewer filled with a non-transparent fluid. Such a device should also be able to obtain measurements of the size of the sewer. In view of the fact that sewers are commonly filled with explosive gases, such a device should be explosion proof or inherently explosion proof. The present invention satisfies this need.

SUMMARY OF THE INVENTION

The present invention is a sewer inspection tool that in one position has a compact size, enabling it to be lowered through a manhole into a sewer. It has a cylindrical body and a plurality of transducers that are mounted on pads adapted to make contact with the interior walls of the sewer. The cylindrical body is pulled by an armored cable that includes conductors for carrying signals between a surface control device and the transducers. In an alternate embodiment, the signals between the surface control device and the transducers are carried in a fiber-optic link. After the device is lowered through a manhole into a sewer, the pads are moved away from the body to make contact with the walls of the sewer. The transducers can be of various types, including electromagnetic transducers. The tool is also provided with a sensor for measuring the size of the sewer from the movement of the pads away from the body. Position measurement is obtained by measurement of the movement of the cable.

DETAILED DESCRIPTION OF THE INVENTION

Figure 1A:
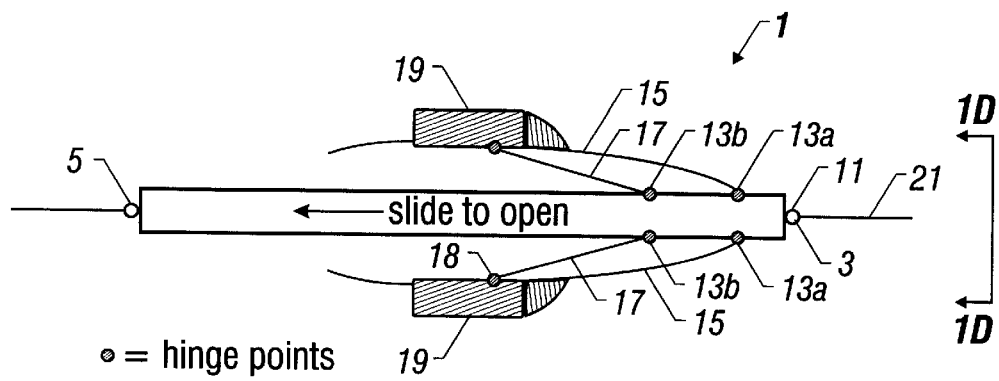
FIGS. 1A–1D schematically illustrate the inspection device.
Figure 1B:
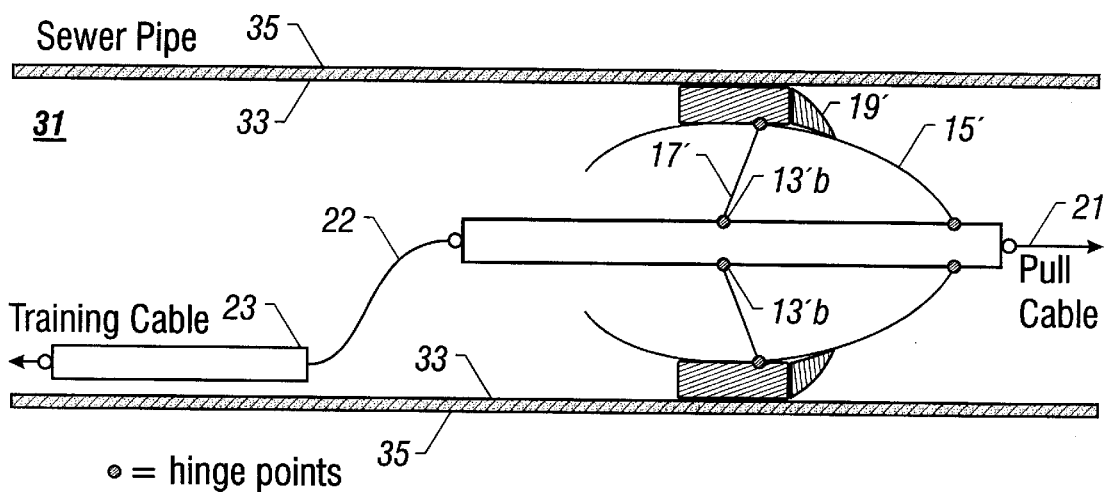
Figure 1C:
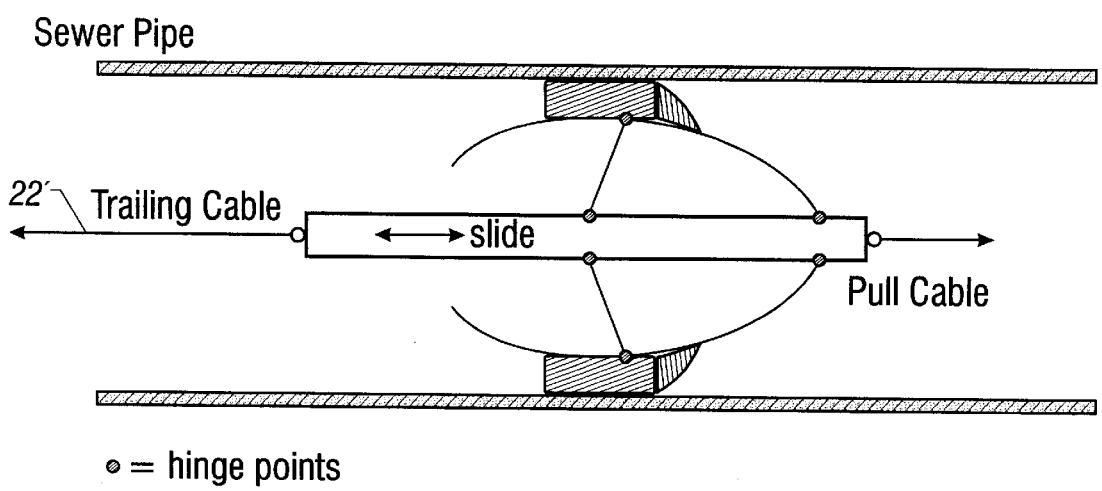
Figure 1D:
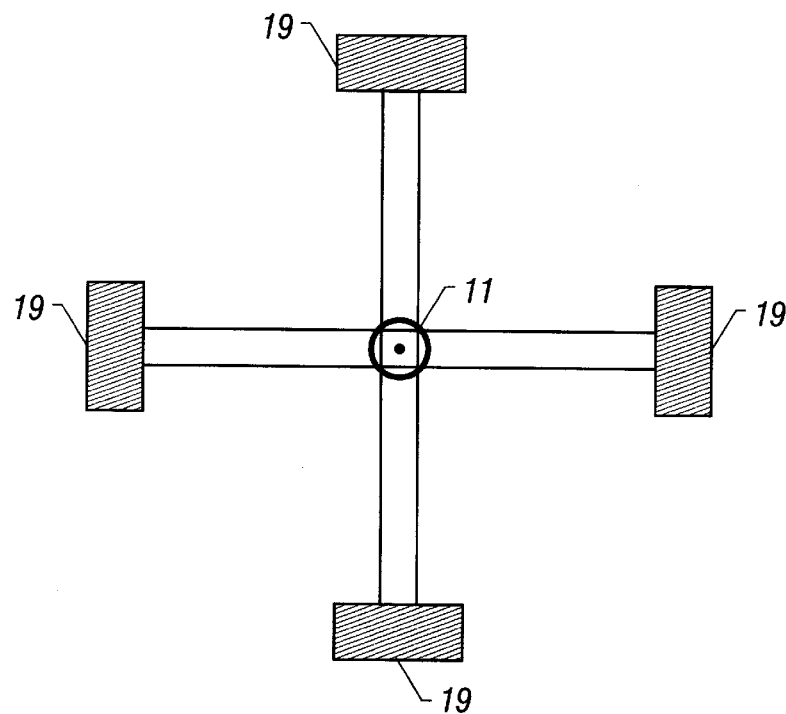
Figure 2:
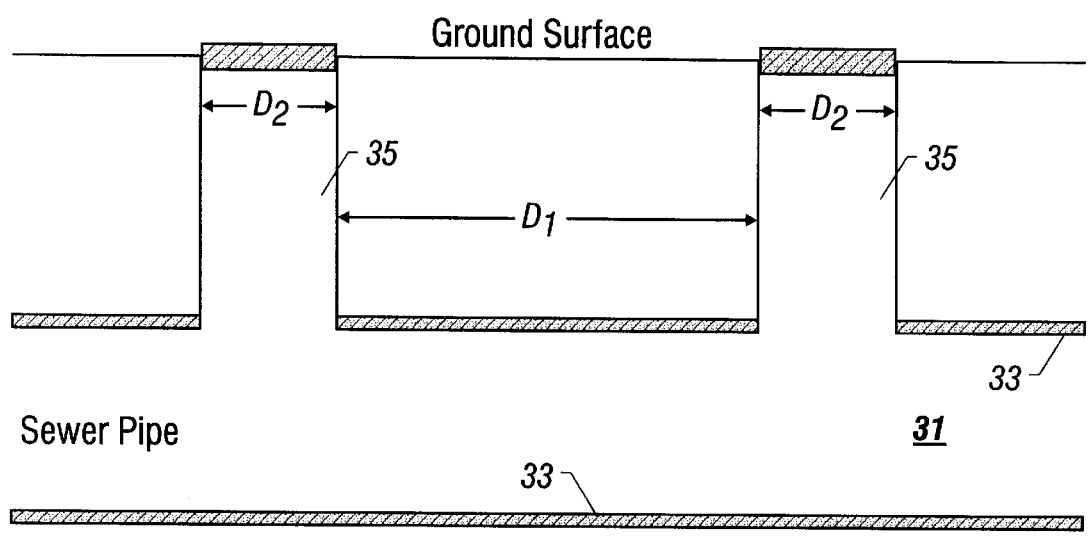
FIG. 2 illustrates the configuration of a sewer in which the inspection device of FIG. 1 is used.

The present invention is best understood by reference to the FIGS. 1–3. FIG. 1A is a schematic illustration of the inspection device 1 in the retracted position. The body 11 of the tool has two ends that, for convenience, are called the front end and the rear end. The front end is provided with a fastening device 3, such as a hook, to which an armored pull cable 21 is attached. The armored cable includes a conductor or fiber-optic cable, not shown, for carrying signals to and from the inspection device. To the body of the tool 11 are attached a plurality of pad mounted transducers, 19. Based on signals from a surface controller (not shown) carried by the cable, the transducers emit signals of various types and make measurements of the response of the sewer and the earth in response to the signals. The signals and measurements are described below. The measurements are conveyed back to the surface controller by means of the conductor or fiber-optic cable. In the preferred embodiment, the pads are four in number, as shown in an end view FIG. 1D. Each pad can have more than one transducer attached to it. Each of the pads is attached to the body by at least two arms (members) 15 and 17. One end of each of the arms 15 and 17 is pivotably attached to a hinge 18 on the pad. The other ends of the arms 15 and 17 are attached to hinges 13a and 13b on the body. There are two types of hinges: the type 13a, attached to arms 15, is in a fixed position on the body 11 of the device, and the type 13b attached to arms 17 are slidably attached to the body 11 of the device. The rear end of the body is provided with another fastening device 5, such as a hook, to which a trailing cable 22 is attached. The tool is kept in the retracted position of FIG. 1A for lowering into the sewer as described below. Leads from the sensor pad to the conductor or fiber-optic cable are used to convey the measurements made by the sensors.

FIG. 1B shows the tool in the expanded position inside a sewer 31. The expansion is accomplished by sliding the hinges 13b towards the rear end of the tool from the retracted position to the position 13b'. In one embodiment of the invention, the movement of the hinge is be accomplished by a spring, not shown. In alternate embodiment of the invention, movement of the hinge is powered by a canister of pressurized gas carried in the tool body (not shown) or by a motor. Such spring, gas or motor operated arrangements for movement of the hinge would be familiar to those versed in the art and are not discussed here. The effect of this movement is to force the pads outward from the body 11 to the position 19'. This urges the pads outward to make contact with the interior wall 33 of the sewer 31 and enables the transducers on the pad to generate signals and make measurements relating to the condition of the sewer wall and the ground in immediate contact with the sewer wall.

Once the tool has been expanded so that the transducers are in contact with the walls of the sewer, the tool is towed by the leading cable as shown in FIG. 1C. Measurements at the surface keep track of the motion of the tool, giving an accurate indication of the position of the tool. Various types of measurements can be carried out by the transducers.

The transducers on the pad are designed to give information about conditions in the immediate vicinity of the sewer pipe. In one embodiment of the invention, ground penetrating radar (GPR) transducers are carried on the pads. These are well known in prior art for detection of near surface anomalies in geological prospecting. As used in the present invention, GPR includes a radio frequency ("RF") transmitter that emits a radar signal into the sewer and the surrounding earth in response to a command signal from the controller. The GPR also includes a receiver that detects the RF signals reflected by the sewer pipe and the ground outside the sewer pipe. The reflected signal is carried by the conductor or fiber-optic cable to the controller for processing using standard techniques. GPR is of little use in metallic pipes but with substantially non-metallic pipes, including concrete pipes having steel reinforcement, it provides valuable information about defects in the sewer and voids in the earth outside the sewer pipe. The GPR arrangement is in the category that would be considered inherently safe for use in sewers because of the absence of sparks that might ignite explosive vapors in the sewer. In typical operation, the RF pulses are generated and recorded 100,000 times every second. In a preferred embodiment of the invention, the center frequency of the GPR signal is typically between 400 MHZ and 2 GHz, enabling the apparatus to detect voids and defects greater than 1 cm. in size in the vicinity of the pipe.

Sonic devices have been used in wireline logging in hydrocarbon exploration. One particular example is ultrasonic logging to determine the adequacy and integrity of cementing on the outside of well casing. A transmitter sends an ultrasonic pulse into the casing and a receiver detects the reflected acoustic signals. Processing of the reflected signals provides information about voids and gaps in the cement surrounding a well casing. One embodiment of the present invention uses similar sonic devices to provide information about defects in the sewer pipe and the presence of cavities or voids in the earth outside.

Gamma ray logging is also used extensively in hydrocarbon exploration to give measurements of the density of the formation surrounding a borehole. In the present context, gamma ray measurements can also provide information about the presence of cavities or voids in the earth outside the sewer due to their effect on a measured density by a gamma ray device.

Electromagnetic Induction measurements that measure flux leakage could also be used. In the present invention, these are of limited utility when the sewer pipe is made of a non-magnetic material but can, in magnetic materials, provide useful information about defects in the walls of the pipe. Use of EM methods for such applications would be familiar to those versed in the art and is not disclosed here further.

In an alternate embodiment, the tool is provided with a sensor (not shown) that measures the amount of sliding movement of hinges 13b along the body of the tool. The position of the hinge 13b is directly related with the outward movement of the pads, giving a measurement of the size of the sewer. The relation between the hinge position and the extended position of the pad is determined by calculation using known techniques or, alternatively, from actual calibration measurements performed outside the sewer. Having four such measurements of the extended position of the arms, it is possible to use known methods to determine the size of the sewer and a deviation from circularity of the sewer.

FIGS. 1A–1D show a single set of four pad mounted sensors on the body of the tool. Those versed in the art would recognize that with the expansion of the arms from the retracted position to the extended position, there would be a gap between the pads when they are in contact with the inner wall of the pipe. In an alternate embodiment (not shown), additional sets of pads in a staggered arrangement are provided, enabling the device to make measurements around more of the circumference of the sewer.

As indicated in FIG. 1B, a supplementary sensor module 23 may be attached to the trailing cable. Sensors on this module can also give information about the sewer pipe and its environs. In one embodiment of the invention, the supplementary module is deployed when the pipe is wholly or partially filled with a fluid such as sludge. The supplementary sensor module can either be dragged along the bottom of the pipe (if the trailing cable is slack) or partially suspended in the fluid (if the trailing cable has sufficient tension to suspend the module). In such a configuration, narrow aperture sonic devices can send sonic signals through the fluid. Detection and processing of the reflected signals can give information about the thickness of the pipe and also about cavities outside the pipe. Processing of such signals in other contexts would be familiar to those versed in the art and is not described here further.

In another embodiment of the invention, the supplementary sensor module is provided with resistivity measurement devices. Resistivity measurements made with the module at the bottom of the sewer give useful information about possible leakage of fluids out of the pipe.

FIG. 2 illustrates a typical arrangement in which the sewer inspection device is used. Shown is a sewer 31 with interior walls 33 as in FIG. 1. The sewer is provided with inspection manholes 35 at known intervals for providing access to the sewer. The manholes 35 are typically circular in shape and have a diameter $D_2$ of two feet or more. They are commonly spaced at a distance $D_1$ no more than 800 feet apart.

Figure 3A:
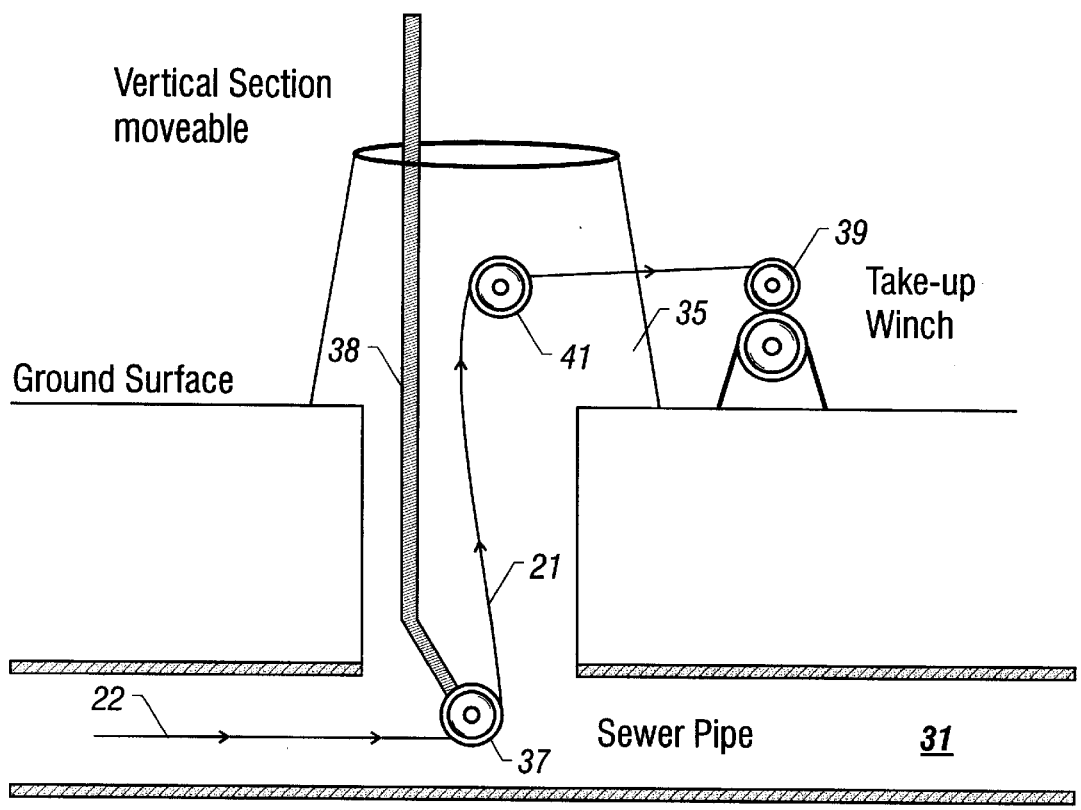
FIGS. 3A–3B illustrate the operation of the device in a sewer.
Figure 3B:
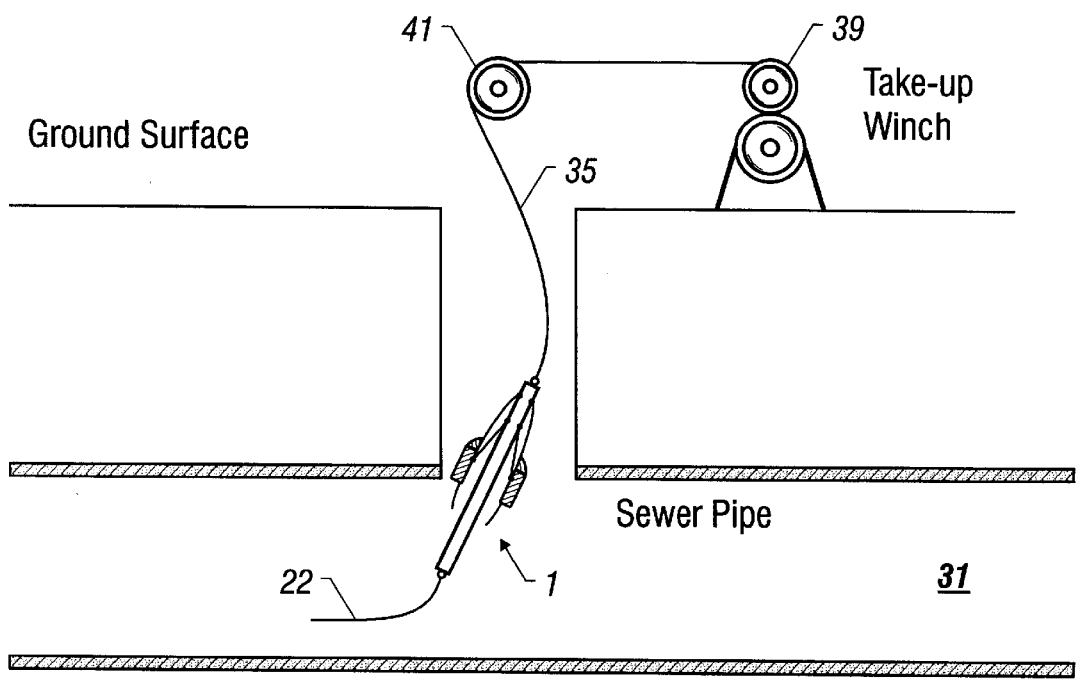

FIGS. 3A and 3B show the manner of deployment of the inspection tool in the sewer. For towing the tool, the arrangement shown in FIG. 3A is used. A roller, 37, is lowered into the manhole at the end of a suitable support 38. The taut pull cable 21 is wound around the roller 37, a second roller 41, and thence to the take up winch 39. The arrangement for supporting the rollers 37 and 41 would be familiar to those versed in the art and is not described. A counter on the take-up winch measures the motion of the cable 21 to give an indication of the position of the inspection tool. The other end of the cable goes to a control and recording device (not shown).

The manner of lowering the tool in the sewer is shown in FIG. 3B. The tool 1 is shown in the retracted position with the slack in the trailing cable. With the roller 37 out of the way, the take-up reel 39 is unwound to lower the tool into the manhole 35. Once the tool makes contact with the bottom of the sewer, the roller 37 is lowered into the manhole and the trailing cable 22 is pulled to a taut position. Raising the tool is performed by reversing the steps used in lowering the tool.

The foregoing description has been for illustrative purposes. Persons of ordinary skill in the art will appreciate that many modifications may be made to the embodiments described herein without departing from the spirit of the present invention. In particular, the description was based on the use of the inspection device in a sewer pipe. The apparatus and method of the invention can also be used in inspection of pipes used for other purposes, such as oil and gas pipelines. Pipes used for such purposes are usually made of a metal such as steel, making the electromagnetic induction sensors particularly useful in detecting flaws in the pipeline walls. However, access to such pipelines is more limited than it is for sewers. Nevertheless, the present invention can be used with minor modifications in the inspection of such pipelines. Accordingly, the embodiments described herein are illustrative only and are not intended to limit the scope of the present invention.

I claim:

1. An apparatus conveyed in a buried substantially non-metallic pipe for locating and characterizing defects in the vicinity of the buried pipe, the pipe having an inside wall, said apparatus comprising:
   (a) an elognated body, adapted for passage through the pipe;
   (b) a plurality of ground penetrating radar (GPR) transducers mounted on a plurality of pads, said plurality of pad-mounted transducers and adapted to make contact with the inside wall to send signals and make measurements relating to the defects in the vicinity of the buried pipe; and
   (c) devices for extending the plurality of pads to make contact with the inside wall, said devices selected from the group consisting of: (i) pneumatically operated, (ii) spring operated, and (iii) motor operated.

2. The apparatus of claim 1 wherein the first plurality of transducers are selected from the group consisting of (i) radio frequency electromagnetic transducers, (ii) gamma ray transducers, (iii) sonic transducers, and (iv) electromagnetic induction transducers.

3. The apparatus of claim 1 further comprising an armored cable for conveying the apparatus in the pipe, the armored cable including a cable for carrying signals between the transducers and a surface controller.

4. The apparatus of claim 3 further comprising a supplementary module connected to the body by a cable and carrying transducers, said transducers adapted to make measurement relating to the defects in the vicinity of the buried pipe.

5. The apparatus of claim 4 wherein the transducers on the supplementary module are selected from the set consisting of (i) sonic transducers, and (ii) resistivity transducers.

6. The apparatus of claim 1 wherein the plurality of pads is selected from the set consisting of: (i) two, (ii) two, and (iii) four.

7. The apparatus of claim 1 wherein the plurality of GPR transducers have a center frequency between 400 MHZ. and 2 Ghz.

8. An apparatus conveyed in a substantially non-metallic pipe for locating and characterizing defects in the pipe, the pipe having an inside wall, said apparatus comprising:
   (a) an elongated body, adapted for passage through the pipe;
   (b) a plurality of pad-mounted Ground Penetrating Radar (GPR) transducers operatively coupled to the body, said transducers adapted to make contact with the inside wall to send signals and make measurements relating to the defects in the pipe; and
   (c) devices for extending the plurality of pads to make contact with the inside wall, said devices selected from the group consisting of: (i) pneumatically operated, and (ii) spring operated, and (iii) motor operated.

9. The apparatus of claim 8 wherein the plurality of pads is selected from the set consisting of: (i) two, (ii) two, and (iii) four.

10. The apparatus of claim 8 wherein the transducers are selected from the group consisting of (i) radar frequency electromagnetic transducers, (ii) gamma ray transducers, (iii) sonic transducers, and (iv) electromagnetic induction transducers.

11. The apparatus of claim 8 further comprising an armored cable for conveying the apparatus in the pipe, the armored cable including a cable for carrying signals between the transducers and a surface controller.

12. The apparatus of claim 11 further comprising a supplementary module connected to the body by a cable and carrying transducers, said transducers adapted to make measurements relating to the defects in the pipe.

13. The apparatus of claim 12 wherein the transducers on the supplementary module are selected from the set consisting of (i) sonic transducers, and (ii) resistivity transducers.

14. A method for locating and characterizing defects in a substantially non-metallic pipe, the pipe having an inside wall, said method comprising:
   (a) inserting an apparatus having an elongated body into the pipe, the apparatus having a plurality of pad-mounted ground penetrating radar (GPR) transducers operatively coupled to the body;
   (b) operating a device on the body to extend the pad mounted GPR transducers to make contact with the inside wall;
   (c) using the pad-mounted transducers to make measurements relating to the defects in the pipe;
   (d) pulling the body by means of an armored cable attached to the body.

15. The method of claim 14 further comprising:
   (i) attaching a supplementary module containing transducers to the elongated body by means of a cable; and
   (ii) using the transducers on the supplementary module to make additional measurements relating to the defects in the pipe.

16. The method of claim 15 wherein additional measurements are selected from the set consisting of (i) sonic measurements, and (ii) resistivity measurements.

17. A method for locating and characterizing defects in the vicinity of a buried, substantially non-metallic pipe, the pipe having an inside wall, said method comprising:
   (a) inserting an apparatus having an elongated body into the pipe, the apparatus carrying a plurality of pad-mounted ground penetrating radar (GPR) transducers;
   (b) operating a device on the body to extend the pad mounted GPR transducers to make contact with the inside wall;
   (c) taking measurements relating to the defects in the vicinity of the buried pipe;
   (d) moving the apparatus through the buried pipe and taking the measurements over a length of the pipe.

18. The method of claim 17 further comprising:
(i) attaching a supplementary module containing transducers to the elongated body by means of a cable; and
(ii) using the transducers on the supplementary module to make additional measurements relating to the defects in the pipe.

19. The method of claim 17 wherein using the pad mounted sensors comprises making measurements at a frequency greater than 400 MHZ. and less than 2 GHZ.

20. The method of claim 17 wherein the plurality of pads is selected from the set consisting of: (i) two, (ii) two, and (iii) four.

21. An apparatus conveyed in a buried substantially non-magnetic pipe for measuring at least one parameter of interest of a subterranean defect, the pipe having an inside wall, said apparatus comprising:

(a) an elongated body, adapted for passage through the pipe;

(b) a plurality of Ground Penetrating Radar (GPR) transducers mounted on a plurality of pads, said plurality of pad-mounted transducers adapted to make contact with the inside wall to make measurements relating to the at least one parameter of interest.

22. The apparatus of claim 21 wherein the subterranean defect is selected from the set consisting of (i) a crack in the pipe, (ii) a weakness in the pipe, (iii) a deformation of the pipe, and (iv) a collapsed zone outside the pipe.

23. The method of claim 14 wherein the plurality of pads is selected from the set consisting of: (i) two, (ii) two, and (iii) four.

* * * * *